(12) United States Patent
Cabrera et al.

(10) Patent No.: US 10,129,330 B2
(45) Date of Patent: Nov. 13, 2018

(54) ATTACHMENT OF CLOUD SERVICES TO BIG DATA SERVICES

(71) Applicant: International Business Machines Corporation, Armonk, NY (US)

(72) Inventors: Guillermo Cabrera, Austin, TX (US); Jacob D. Eisinger, Austin, TX (US); David C. Fallside, San Jose, CA (US); Robert C. Senkbeil, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 14/944,625

(22) Filed: Nov. 18, 2015

(65) Prior Publication Data

US 2017/0142189 A1    May 18, 2017

(51) Int. Cl.
*G06F 15/16*    (2006.01)
*H04L 29/08*    (2006.01)

(52) U.S. Cl.
CPC .............. *H04L 67/10* (2013.01); *H04L 67/18* (2013.01)

(58) Field of Classification Search
CPC ... H04L 41/5041; H04L 45/124; H04L 63/20; H04L 67/125; H04L 67/18; G06F 1/3203; G06F 8/71; G06F 9/505; G06F 9/5072; G06F 12/0223
See application file for complete search history.

(56) References Cited

U.S. PATENT DOCUMENTS

| | | | |
|---|---|---|---|
| 9,195,393 B1 * | 11/2015 | Li | G06F 12/0223 |
| 9,690,575 B2 * | 6/2017 | Prismon | G06F 8/71 |
| 9,749,218 B1 * | 8/2017 | Felstaine | H04L 45/124 |
| 2010/0257010 A1 | 10/2010 | Allam et al. | |
| 2010/0319004 A1 * | 12/2010 | Hudson | G06F 9/5072 |
| | | | 719/313 |
| 2012/0046980 A1 | 2/2012 | Allam et al. | |
| 2012/0166648 A1 | 6/2012 | Oh et al. | |
| 2012/0303818 A1 * | 11/2012 | Thibeault | G06F 9/5072 |
| | | | 709/226 |
| 2013/0086235 A1 * | 4/2013 | Ferris | G06F 9/505 |
| | | | 709/223 |
| 2013/0304863 A1 * | 11/2013 | Reber | G06F 1/3203 |
| | | | 709/218 |
| 2014/0033268 A1 * | 1/2014 | Julisch | H04L 63/20 |
| | | | 726/1 |

(Continued)

FOREIGN PATENT DOCUMENTS

WO    2010031699 A1    3/2010

OTHER PUBLICATIONS

Wikipedia, "Big data", Wikipedia: free encyclopedia, retreived Nov. 4, 2015, 20 pages.

*Primary Examiner* — Dustin Nguyen
(74) *Attorney, Agent, or Firm* — Jordan IP Law, LLC

(57) ABSTRACT

Methods and systems may provide for identifying a data service having a data locality constraint, determine whether capability data associated with the data service satisfies one or more deployment criteria of a cloud service and bind, if the capability data satisfies the one or more deployment criteria, the cloud service to the data service in accordance with the data locality constraint. In one example, the data service is identified based at least in part on a capability of the cloud service to be provisioned with a deployment location that complies with the data locality constraint.

19 Claims, 3 Drawing Sheets

(56) References Cited

U.S. PATENT DOCUMENTS

2014/0351430 A1* 11/2014 Madani .............. H04L 41/5041
709/224
2016/0021173 A1* 1/2016 Tapia .................... H04L 67/125
709/204

* cited by examiner

FIG. 1
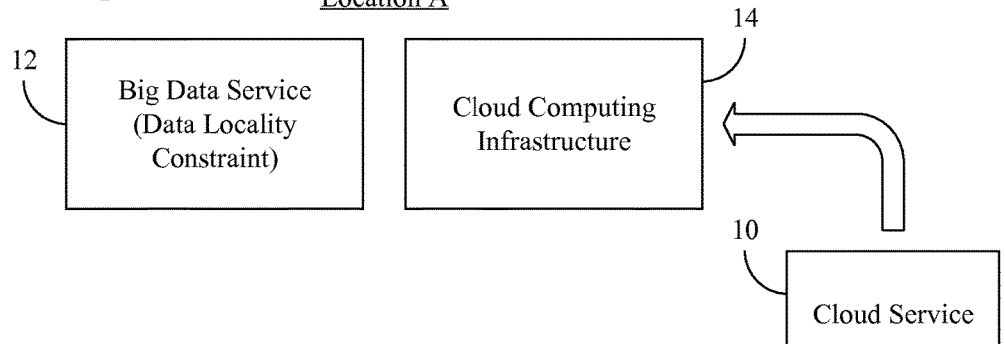
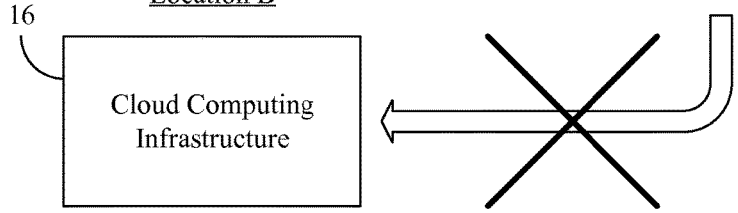
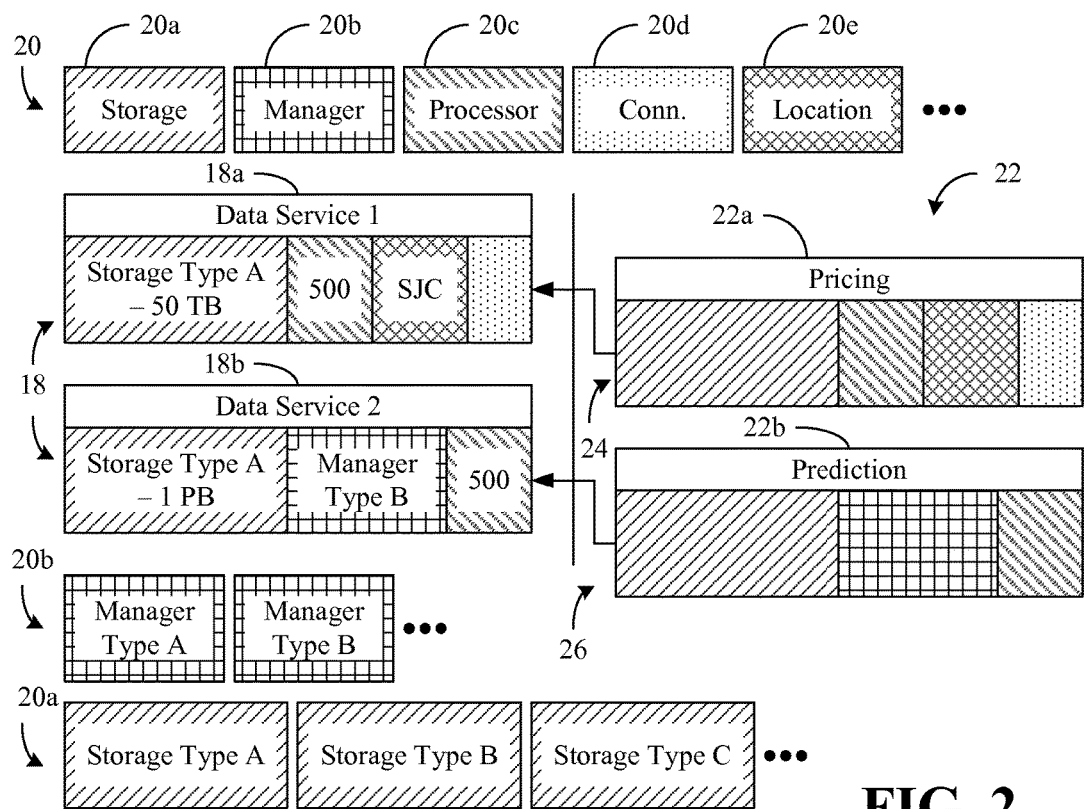
FIG. 2

US 10,129,330 B2

ATTACHMENT OF CLOUD SERVICES TO BIG DATA SERVICES

BACKGROUND

Embodiments of the present invention generally relate to computing service management. More particularly, embodiments relate to the attachment and/or binding of cloud services to big data services.

Cloud services may provide computational and storage assistance in a wide variety of settings such as, for example, document management, customer support, social media, information technology (IT) and other applications. A typical cloud service may operate on a cloud computing infrastructure that is dedicated to and integrated with the cloud service. In some situations, however, the cloud service may use a separate big data service to support operations involving the storage of large amounts of loosely structured data (e.g., petabytes or exabytes of data containing billions to trillions of records). Due to the amount of data involved, information transfers between the cloud service and the big data service may be susceptible to latencies and bandwidth limitations.

BRIEF SUMMARY

Embodiments may include an apparatus comprising a service locator to identify a data service having a data locality constraint, a dependency manager communicatively coupled to the service locator, the dependency manager to determine whether capability data associated with the data service satisfies one or more deployment criteria of a cloud service, and an attachment controller communicatively coupled to the dependency manager, the attachment controller to bind, if the capability data satisfies the one or more deployment criteria, the cloud service to the data service in accordance with the data locality constraint.

Embodiments may also include a computer program product to configure services, the computer program product comprising a computer readable storage medium having program instructions embodied therewith, the program instructions executable by a computer to cause the computer to identify a data service having a data locality constraint, retrieve capability data from a service publication source, wherein the capability data is associated with the data service and identifies one or more of a storage capacity, a resource manager, a processor capacity, a connection configuration or a datacenter associated with the data service, determine whether the capability data satisfies one or more deployment criteria of a cloud service, and bind, if the capability data satisfies the one or more deployment criteria, the cloud service to the data service in accordance with the data locality constraint, wherein the data service is to be identified based at least in part on a capability of the cloud service to be provisioned with a deployment location that complies with the data locality constraint and the deployment location is to be within proximity of a location of the data service.

Embodiments may also include a method comprising identifying a data service having a data locality constraint, retrieving capability data from a service publication source, wherein the capability data is associated with the data service and identifies one or more of a storage capacity, a resource manager, a processor capacity, a connection configuration or a datacenter associated with the data service, determining whether the capability data satisfies one or more deployment criteria of a cloud service, and binding, if the capability data satisfies the one or more deployment criteria, the cloud service to the data service in accordance with the data locality constraint, wherein the data service is identified base at least in part on a capability of the cloud service to be provisioned with a deployment location that complies with the data locality constraint and the deployment location is within proximity of a location of the data service.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 1 is a block diagram of an example of a cloud service deployment according to an embodiment;

FIG. 2 is a block diagram of an example of a service binding according to an embodiment;

DETAILED DESCRIPTION

Figure 3:
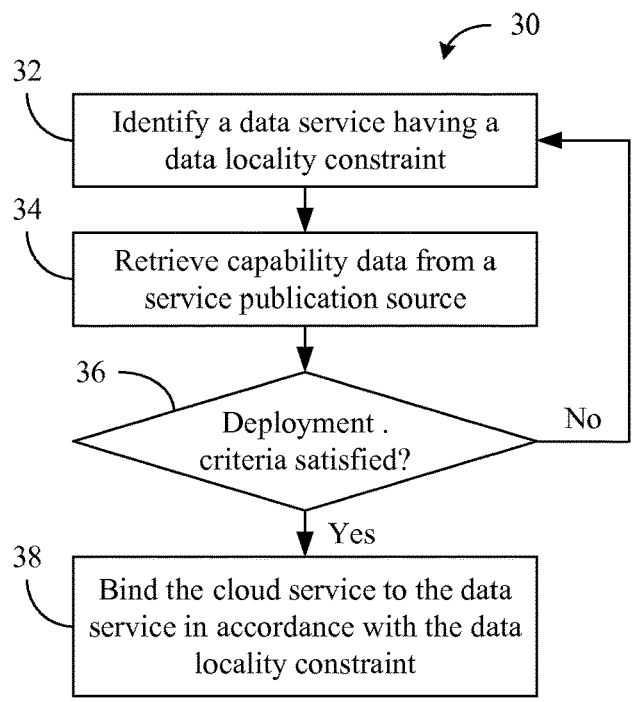
FIG. 3 is a flowchart of an example of a method of configuring services according to an embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in at least one particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Turning now to FIG. 1, a deployment scenario is shown in which a cloud service 10 is bound with a data service 12. The cloud service 10 may generally provide computing assistance with regard to pricing, prediction, document management, customer support, social media, IT and/or other applications. During operation, the cloud service 10 may use data gathered by numerous information-sensing mobile devices, aerial (remote sensing), software logs, cameras, microphones, radio-frequency identification (RFID) readers, wireless sensor networks, and so forth. Accordingly, the data used by the cloud service 10 may be both large in quantity and relatively unstructured. The illustrated data service 12, which may provide additional storage and/or computational support to the cloud service 10, may be considered a big data service to the extent that it is capable of housing large amounts of loosely structured data (e.g., petabytes or exabytes of data containing billions to trillions of records).

As will be discussed in greater detail, the data service 12 may have a data locality constraint that reflects the communication latency and bandwidth limitations of the data service 12. In the illustrated example, knowledge of the data locality constraint enables the cloud service 10 to be deployed to a cloud computing infrastructure 14 that is within proximity of the data service 12 (e.g., at "Location A", which may be a common city, datacenter, etc.) rather than another cloud computing infrastructure 16 that is not within proximity of the data service 12 (e.g., at "Location B"). Accordingly, taking the data locality constraint of the data service 12 into account when configuring and/or binding the cloud service 10 for deployment may enable the cloud service 10 to obviate concerns over latency and/or bandwidth. The illustrated solution may therefore significantly enhance performance.

FIG. 2 shows an example of a service binding in greater detail. In the illustrated example, a plurality of big data services 18 (18a, 18b) have one or more dependencies 20 (20a-20e) such as, for example, a storage capacity dependency 20a, a resource manager dependency 20b, a processor capacity dependency 20c, a connection configuration dependency 20d, a location (e.g., datacenter) dependency 20e, and so forth. The dependencies 20 may be expandable to expose the various types of capabilities that fall under the given dependency. For example, the resource manager dependency 20b may be expandable to expose "Manager Type A" (e.g., YARN), "Manager Type B" (e.g. MESOS), and so forth. Similarly, the illustrated storage capacity dependency 20a is expandable to expose "Storage Type A" (e.g., HADOOP Distributed File System/HDFS), "Storage Type B" (e.g., CASSANDRA), "Storage Type C" (DB2), and so forth. Each data service 18 may publish its respective dependencies (e.g., to a service publication source) as capability data (e.g., metadata) that is viewable by an individual and/or system configuring one or more cloud services 22 (22a, 22b) for deployment. In one example, the capability data is presented in a drag and drop user interface (UI) that facilitates the binding of services. Alternatively, the bindings may be created automatically.

Thus, a first data service 18a might publish capability data indicating the amount and type of storage capacity dependency 20a (e.g., 50 TB of Storage Type A), the amount of processor capacity dependency 20c (e.g., 500 processors), the location dependency 20e (e.g., San Jose Center/SJC), the details of the connection configuration dependency 20d, etc., associated with the first data service 18a. The location dependency 20e may be considered a data locality constraint of the first data service 18a. Additionally, a second data service 18b may publish capability data indicating the amount and type of storage capacity dependency 20a (e.g., 1 PB of Storage Type A), the type of resource manager dependency 20b (e.g., Manager Type B), the amount of processor capacity dependency 18b (e.g., 300 processors), etc., associated with the second data service 18b. The capability data may be published in a format compatible with, for example, JAVASCRIPT Object Notation (JSON), extensible markup language (XML), database record notation, or other suitable format.

Accordingly, a first cloud service 22a (e.g., Pricing service) may have a corresponding set of deployment criteria (not shown). In the illustrated example, if it is determined that the capability data corresponding to the first data service 18a (e.g., specifying a particular storage, processor, location and connection capability) satisfies the deployment criteria corresponding to the first cloud service 22a, the capability data is incorporated into a deployment plan 24 of the first cloud service 22a. Of particular note is that binding the first cloud service 22a to the first data service 18a may include provisioning the cloud service 22a with a deployment location that complies with the location dependency (e.g., SJC data locality constraint) of the first data service 18a. Indeed, the first data service 18a may be identified and/or selected based on a capability of the first cloud service 22a to be provisioned with a deployment location that complies with the location dependency of the first data service 18a. Incorporating the location dependency into the deployment plan associated with the first cloud service 22a may enable the deployment location of the cloud service 22a to be within proximity of the location of the first data service 18a (e.g., near SJC). As a result, latency and/or bandwidth benefits may be realized.

A second cloud service 22b (e.g., Prediction service) may also have a corresponding set of deployment criteria. Thus, if it is determined that the capability data corresponding to the second data service 18b (e.g., that specify a particular storage, resource manager and processor capability) satisfies the deployment criteria corresponding to the second cloud service 22b, the capability data is incorporated into a deployment plan 26 of the second cloud service 22b. In the illustrated example, the second cloud service 22b may be deployed without regard to the location of the second data service 18b. The nature and amount of data handled by the cloud services 22 may be taken into consideration when structuring the deployment criteria (e.g., deciding whether to use location-specific deployment).

FIG. 3 shows a method 30 of configuring services. The method 30 may generally be implemented as hardware, software, firmware, etc., or any combination thereof. Illustrated processing block 32 provides for identifying a data service having a data locality constraint. In one example, the data service is a big data service. The data locality constraint may indicate, for example, that communications with the data service outside a particular location, geographic area/radius, datacenter, etc., may be susceptible to relatively high latencies or bandwidth usage due at least in part to the amount of data being transferred. Thus, the data service may be identified based at least in part on a capability of a cloud service to be provisioned with a deployment location that satisfies the data locality constraint. Capability data may be retrieved from a source such as, for example, a service publication source at block 34, wherein the capability data is associated with the data service. The capability data may identify, for example, storage capacity, resource manager, processor capacity, connection configuration, datacenter and/or other information associated with the data service.

A determination may be made at block 36 as to whether one or more deployment criteria of the cloud service are satisfied. The deployment criteria may include, for example, connection criteria (e.g., specifying communication protocols and/or interfaces), location criteria (e.g., specifying that data service location capability be made public), and so forth. If the deployment criteria are not satisfied, the illustrated method 30 returns to block 32. Otherwise, illustrated block 38 automatically binds the cloud service to the data service in accordance with the data locality constraint. Block 38 may include provisioning the cloud service with a deployment location that complies with the data locality constraint (e.g., so that the deployment location is within proximity of the location of the data service). In one example, provisioning the cloud service includes incorporating the data locality constraint into a deployment plan associated with the cloud service. Other aspects of the capability data (e.g., storage capacity, resource manager, processor capacity, connection configuration) may also be incorporated in to the deployment plan.

Figure 4:
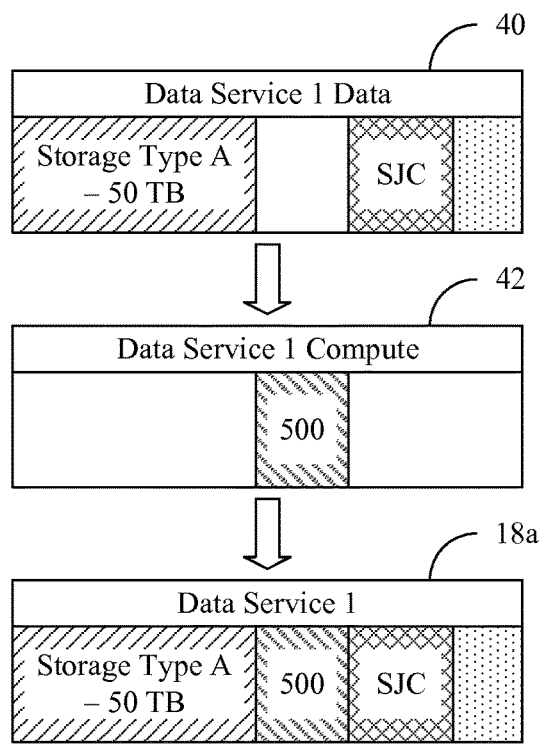
FIG. 4 is a block diagram of an example of a service hierarchy according to an embodiment.

Turning now to FIG. 4, service hierarchy scenario is shown in which one underlying data service 40 may be associated with storage capacity (e.g., 50 TB of Storage Type A housed in SJC) and another underlying data service 42 may be associated with processor capacity (e.g., 500 processors), wherein the first data service 18a includes both of the underlying data services 40, 42. In such a case, the service publication for the first data service 18a may include a service hierarchy that includes a first service identifier corresponding to the underlying data service 40 and a second service identifier corresponding to the underlying data service 42. Table I below shows another service hierarchy example in which a data service supports a Pricing application in a hierarchical fashion.

TABLE I

| Service | Requirement |
| --- | --- |
| Storage Type C | None |
| Storage Type A | None |
| 32 big data processors | Storage Type A |
| Pricing application | 32 big data processors |

Figure 5:
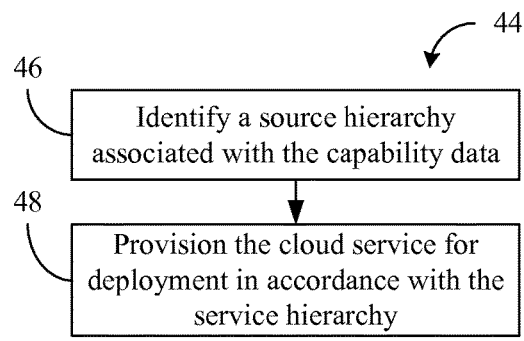
FIG. 5 is a flowchart of an example of a method of binding a cloud service to a service hierarchy according to an embodiment.

FIG. 5 shows a method 44 of binding a cloud service. The method 44 may generally be implemented as hardware, software, firmware, etc., or any combination thereof. Illustrated processing block 46 provides for identifying a source hierarchy associated with capability data of a data service. Additionally, the cloud service may be provisioned for deployment at block 48 in accordance with the service hierarchy. In one example, the service hierarchy includes a first service identifier that is associated with storage capacity and a second service identifier that is associated with processor capacity.

Figure 6:
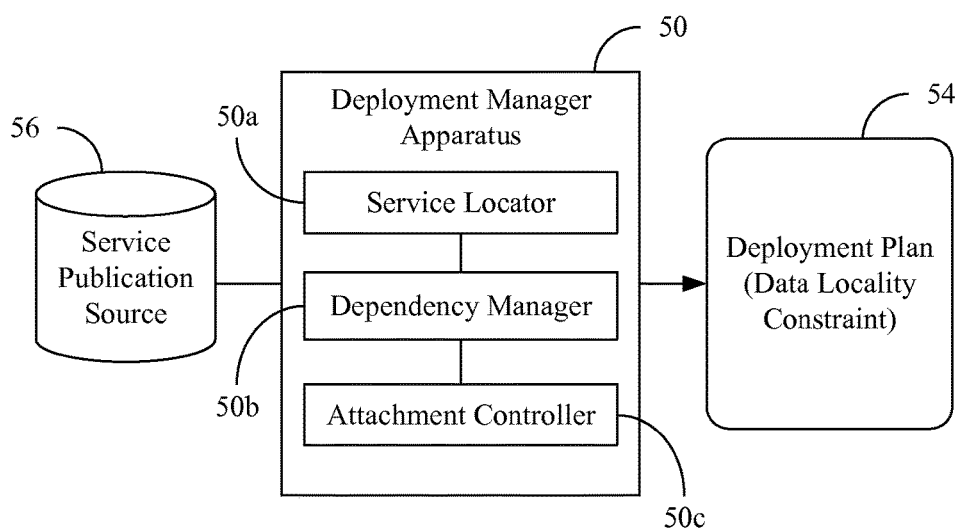
FIG. 6 is a block diagram of an example of a deployment manager apparatus according to an embodiment.

FIG. 6 shows a deployment manager apparatus 50 (50a-50c) that may implement one or more aspects of the method 30 (FIG. 3) and/or the method 44 (FIG. 5). The deployment manager apparatus 50 may therefore include hardware, software, firmware, etc., or any combination thereof. In the illustrated example, a service locator 50a may identify a data service having a data locality constraint. A dependency manager 50b communicatively coupled to the service locator 50a may determine whether capability data associated with the data service satisfies one or more deployment criteria of a cloud service. The deployment manager apparatus 50 may also include an attachment controller 50c communicatively coupled to the dependency manager 50b, wherein the attachment controller 50c may bind, if the capability data satisfies the one or more deployment criteria, the cloud service to the data service in accordance with the data locality constraint.

For example, the attachment controller 50c may provision the cloud service with a deployment location that complies with the data locality constraint. As already noted, the deployment location may be within proximity of the location of the data service. The attachment controller 50c may also incorporate the data locality constraint into a deployment plan 54 associated with the cloud service. Additionally, the dependency manager 50b may retrieve the capability data, which may identify a storage capacity, a resource manager, a processor capacity, a connection configuration, a datacenter, etc., from a service publication source. Moreover, the dependency manager 50b may identify a service hierarchy associated with the capability data. In such a case, cloud service may be provisioned for deployment in accordance with the service hierarchy. By way of example, the service hierarchy might include a first service identifier that is associated with storage capacity and a second service identifier that is associated with processor capacity. Other service hierarchies may also be used depending on the circumstances. The data service may be a big data service.

Figure 7:
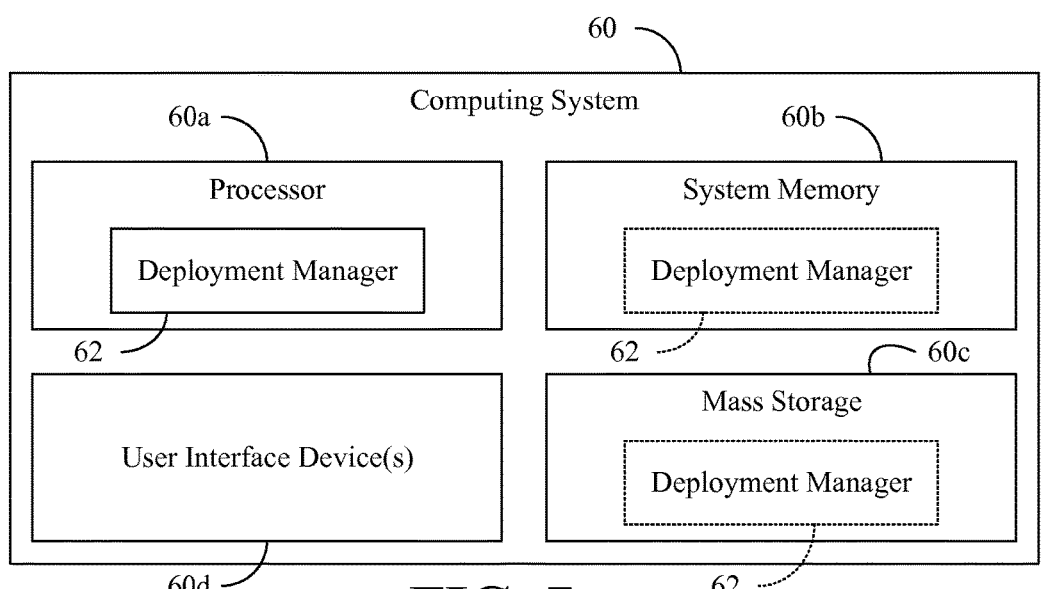
FIG. 7 is a block diagram of an example of a computing system according to an embodiment.

FIG. 7 shows a computing system 60 (60a-60d) that may be used to configure services. In the illustrated example, a processor 60a operates a deployment manager 62, which may optionally be obtained from system memory 60b and/or mass storage 60c of the computing system 60. The deployment manager 62 may cause the computing system 60 to operate similarly to the deployment manager apparatus 50 (FIG. 6), already discussed. Accordingly, the deployment manager 62 may be configured to conduct one or more aspects of the method 30 (FIG. 3) and/or the method 44 (FIG. 5), already discussed. In one example, the deployment manager 62 is configured to identify a data service having a data locality constraint, determine whether capability data associated with the data service satisfies one or more deployment criteria of a cloud service, and bind, if the capability data satisfies the one or more deployment criteria, the cloud service to the data service in accordance with the data locality constraint. The computing system 60 may also include one or more user interface devices 60d to present information regarding the binding to one or more users of the computing system 60. The information may also be presented to the user(s) via a remote device (not shown).

Thus, techniques described herein may provide additional validation and/or confirmation of the efficiency of a cloud service before actual deployment takes place. If a selected data service has a data locality constraint that cannot be met by a proposed deployment location, techniques enable automatic or user-assisted (e.g., in response to a warning) selection/identification of either a different deployment location or a different data service. Moreover, both the data service and the cloud service may remain agnostic to the enhanced binding techniques described herein.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer program product to configure services, the computer program product comprising a computer readable storage medium having program instructions embodied therewith, the program instructions executable by a computer to cause the computer to:

identify a data service having a data locality constraint to identify one or more of a geographic area or a position associated with a location of the data service;

retrieve capability data from a service publication source, wherein the capability data is associated with the data service and identifies one or more of a storage capacity, a resource manager, a processor capacity, a connection configuration or a datacenter associated with the data service;

identify a plurality of deployment locations from one or more deployment criteria of a cloud service, the deployment locations each being a cloud computing infrastructure capable of provisioning the cloud service;

determine whether the capability data satisfies the one or more deployment criteria of the cloud service, wherein the capability data is to satisfy a location criteria of the one or more deployment criteria when a first of the deployment locations is within a proximity of the location of the data service based on an identification that the first deployment location is within at least one of the one or more of the geographic area or the position identified by the data locality constraint;

bind, if the capability data satisfies the one or more deployment criteria, the cloud service to the data service so that the data service is to one or more of provide computational support to the cloud service or provide data storage associated with the cloud service; and deploy the cloud service to the first deployment location in response to the cloud service being bound to the data service.

2. The computer program product of claim 1, wherein the program instructions, when executed, cause a computer to identify a service hierarchy associated with the capability data.

3. The computer program product of claim 2, wherein the cloud service is to be provisioned for deployment in accordance with the service hierarchy and the service hierarchy is to include a first service identifier that is associated with storage capacity, a second service identifier that is associated with processor capacity, a third service identifier that is associated with a type of a resource manager and a fourth service identifier associated with the data locality constraint.

4. The computer program product of claim 1, wherein the data service is to be a big data service.

5. A method comprising:
   identifying a data service having a data locality constraint that identifies one or more of a geographic area or a position associated with a location of the data service;
   retrieving capability data from a service publication source, wherein the capability data is associated with the data service and identifies one or more of a storage capacity, a resource manager, a processor capacity, a connection configuration or a datacenter associated with the data service;
   identifying a plurality of deployment locations from one or more deployment criteria of a cloud service, the deployment locations each being a cloud computing infrastructure capable of provisioning the cloud service;
   determining whether the capability data satisfies the one or more deployment criteria of the cloud service, wherein the capability data is to satisfy a location criteria of the one or more deployment criteria when a first of the deployment locations is within a proximity of the location of the data service based on an identification that the first deployment location is within at least one of the one or more of the geographic area or the position identified by the data locality constraint; and
   binding, if the capability data satisfies the one or more deployment criteria, the cloud service to the data service so that the data service is to one or more of provide computational support to the cloud service or provide data storage associated with the cloud service; and
   deploying the cloud service to the first deployment location in response to the cloud service being bound to the data service.

6. The method of claim 5, further comprising provisioning the cloud service by incorporating the data locality constraint into a deployment plan associated with the cloud service.

7. The method of claim 5, further including identifying a service hierarchy associated with the capability data.

8. The method of claim 7, wherein the cloud service is provisioned for deployment in accordance with the service hierarchy and the service hierarchy includes a first service identifier that is associated with storage capacity, a second service identifier that is associated with processor capacity, a third service identifier that is associated with a type of a resource manager and a fourth service identifier associated with the data locality constraint.

9. The method of claim 5, wherein the data service is a big data service.

10. An apparatus comprising:
    a service locator, implemented at least partly in electronic circuitry, to identify a data service having a data locality constraint to identify one or more of a geographic area or a position associated with a location of the data service;
    a dependency manager, implemented at least partly in electronic circuitry, communicatively coupled to the service locator, the dependency manager to:
        identify a plurality of deployment locations from one or more deployment criteria of a cloud service, the deployment locations each being a cloud computing infrastructure capable of provisioning the cloud service;
        determine whether capability data associated with the data service satisfies the one or more deployment criteria of the cloud service, wherein the capability data is to satisfy a location criteria of the one or more deployment criteria when a first of the deployment locations is within a proximity of the location of the data service based on an identification that the first deployment location is within at least one of the one or more of the geographic area or the position identified by the data locality constraint; and
    an attachment controller, implemented at least partly in electronic circuitry, communicatively coupled to the dependency manager, the attachment controller to:
        bind, if the capability data satisfies the one or more deployment criteria, the cloud service to the data service so that the data service is to one or more of provide computational support to the cloud service or provide data storage associated with the cloud service; and
        deploy the cloud service to the first deployment location in response to the cloud service being bound to the data service.

11. The apparatus of claim 10, wherein the attachment controller is to incorporate the data locality constraint into a deployment plan associated with the cloud service.

12. The apparatus of claim 10, wherein the capability data identifies a storage capacity, a resource manager, a processor capacity, a connection configuration and a datacenter associated with the data service.

13. The apparatus of claim 10, wherein the dependency manager is to identify a service hierarchy associated with the capability data.

14. The apparatus of claim 13, wherein the cloud service is to be provisioned for deployment in accordance with the service hierarchy, a third service identifier that is associated with a type of a resource manager and a fourth service identifier associated with the data locality constraint.

15. The apparatus of claim 13, wherein the service hierarchy is to include a first service identifier that is associated with storage capacity and a second service identifier that is associated with processor capacity.

16. The apparatus of claim 10, wherein the dependency manager is to retrieve the capability data from a service publication source.

17. The apparatus of claim 10, wherein the data service is to be a big data service.

18. The computer program product of claim 1, wherein the data service is a first data service and the capability data does not satisfy the location criteria,
    further wherein the program instructions are executable by a computer to cause the computer to:
        identify a second data service having a second data locality constraint to identify one or more of a second geographic area or a second position associated with a location of the second data service;

determine whether second capability data of the second data service satisfies the one or more deployment criteria of the cloud service, wherein the second capability data is to satisfy the location criteria when a second of the deployment locations is within a proximity of the location of the second data service based on an identification that the second deployment location is within at least one of the one or more of the second geographic area or the second position identified by the second data locality constraint;

bind, if the capability data satisfies the one or more deployment criteria, the cloud service to the second data service so that the second data service is to one or more of provide computational support to the cloud service or provide data storage associated with the cloud service; and deploy the cloud service to the second deployment location in response to the cloud service being bound to the second data service.

19. The computer program product of claim 1, wherein the program instructions, when executed, cause a computer to:

determine that a second of the deployment locations is outside of the proximity of the location of the data service based on an identification that the second deployment location is not within the or more of the geographic area or the position identified by the data locality constraint;

determine that the first deployment location is within the proximity so that the capability data satisfies the one or more deployment criteria and the cloud service is bound to the data service; and deploy the cloud service to the first deployment location but not the second deployment location.

\* \* \* \* \*